(12) United States Patent
Peidous et al.

(10) Patent No.: US 11,041,714 B2
(45) Date of Patent: Jun. 22, 2021

(54) METHOD AND APPARATUS FOR CHARACTERIZING OBJECTS

(71) Applicants: Vassili Peidous, Liberty Township, OH (US); Nina Peydus, Liberty Township, OH (US)

(72) Inventors: Vassili Peidous, Liberty Township, OH (US); Nina Peydus, Liberty Township, OH (US)

( * ) Notice: Subject to any disclaimer, the term of this patent is extended or adjusted under 35 U.S.C. 154(b) by 187 days.

(21) Appl. No.: 16/559,833

(22) Filed: Sep. 4, 2019

(65) Prior Publication Data

US 2020/0080837 A1     Mar. 12, 2020

Related U.S. Application Data

(60) Provisional application No. 62/728,602, filed on Sep. 7, 2018.

(51) Int. Cl.
| | |
|---|---|
| *G01B 11/24* | (2006.01) |
| *G01B 15/00* | (2006.01) |
| *G01N 21/95* | (2006.01) |
| *G01N 21/88* | (2006.01) |

(52) U.S. Cl.
CPC ............ *G01B 11/24* (2013.01); *G01B 15/00* (2013.01); *G01N 21/8851* (2013.01); *G01N 21/9501* (2013.01); *G01N 2201/1045* (2013.01)

(58) Field of Classification Search
CPC ............... G01B 11/24; G01B 15/00; G01N 2201/1045; G01N 21/8851; G01N 21/9501
See application file for complete search history.

(56) References Cited

U.S. PATENT DOCUMENTS

| | | | |
|---|---|---|---|
| 7,477,371 B2* | 1/2009 | Marxer | G01N 21/9501 356/237.1 |
| 2014/0118730 A1* | 5/2014 | Kavaldjiev | G01N 21/9501 356/237.5 |

* cited by examiner

*Primary Examiner* — Seung C Sohn (57) ABSTRACT

A high throughput and high resolution method for characterizing objects is based on scanning their surfaces with a fast spinning probing beam of electromagnetic radiation concurrently with relatively slow object motion. A characterization apparatus comprises a guiding system that directs a primary beam of electromagnetic radiation onto the surface of a characterized object. An actuator repositions the object. An analytical system measures characteristic parameters of secondary electromagnetic radiation instigated by the primary beam of electromagnetic radiation from the object. A register system records the measured characteristic parameters synchronously with instantaneous coordinates of beam spots at which the secondary electromagnetic radiation is instigated. A compact system of probing beam spinning enables fabrication of inexpensive characterization tools with small dimensions. The tools may be conveniently integrated into production or processing equipment to provide an in-situ or in-process characterization.

20 Claims, 8 Drawing Sheets

METHOD AND APPARATUS FOR CHARACTERIZING OBJECTS

FIELD OF THE INVENTION

The present invention relates to analytical instrumentation and methods for characterizing materials, samples and workpieces—measurements, tests, analysis and inspection. In particular, the invention relates to methods and equipment utilizing beams of electromagnetic radiation such as ultraviolet, visible, and infrared light as well as X-ray, and microwaves for characterization.

BACKGROUND OF THE INVENTION

There is a variety of methods and instruments for characterizing research objects and workpieces using beams of electromagnetic radiation [Peter E. J. Flewitt, R. K. Wild, Physical Methods for Materials Characterisation, CRC Press, 2015], [Rohit P. Prasankumar, Antoinette J. Taylor, Optical Techniques for Solid-State Materials Characterization, CRC Press, 2016], [John P. Sibilia, A Guide to Materials Characterization and Chemical Analysis, John Wiley & Sons, 1996], [Amit Bandyopadhyay, Susmita Bose, Characterization of Biomaterials, Newnes, 2013], [Delchasss Woodruff, D. P. Woodruff, T. A. Delchar, Modern Techniques of Surface Science, Cambridge University Press, Mar. 3, 1994]. Such methods find numerous applications in analytical measurements in science, medicine, materials development, production, etc. In these methods and instruments, a primary electromagnetic radiation is directed towards characterized objects so that it interacts with surfaces and materials of the objects resulting in responses which are called in the present invention as "secondary radiation". The secondary radiation may include a remnant, reflected, refracted, transmitted and scattered portions of the primary radiation as well as an emission of electromagnetic radiation induced from the object by the primary beam, etc. The secondary radiation carries information about the object characteristics such as surface condition, structural details, materials composition, etc. In the present invention, properties of the secondary radiation which are specific to characteristics of characterized objects are called as "characteristic signal". An analysis of the secondary radiation allows to extract characteristic signals and achieve the purposes of an intended characterization, i.e. to obtain data about object characteristics.

In many characterization applications, it is required to obtain distributions of object characteristics across the surface of characterized objects. A beam of electromagnetic radiation allows measuring object characteristics from a portion of an object that is localized within the beam spot on the surface of the object. Scanning a surface of an object with narrow beams of electromagnetic radiation allows to obtain distributions of characteristic signals and object characteristics on its surface. In the present invention, scanning beams of electromagnetic radiation in characterization methods and tools are called as "probing beams".

Spatial resolution and throughput are among most critical parameters of characterization methods and tools. These parameters are in the state of a challenging tradeoff. On the one hand, a higher resolution may be achieved with making a probing beam narrower and, therefore, a beam spot on the surface of a characterized object smaller. On the other hand, this leads to a proportional increase in time of scanning the same area of the object surface. For resolving this challenge of characterization throughput, there is a need of increasing the speed of scanning with beams of electromagnetic radiation.

Distributions of object parameters on surfaces of objects may be presented as parametric maps in either image or table forms. In characterization methods and tools with capabilities of probing beam scanning, a parametric map is created pixel by pixel. Characteristic signals from instantaneous positions of a probing beam spot on an object surface are collected, quantified, then associated with coordinates on the object surface and finally recorded. The coordinates of probing beam spots are determined and controlled by automated moving stages, tables, stations, etc. These moving systems implement object scanning by repositioning a characterized object or/and a probing beam.

U.S. Pat. Nos. 7,839,495 and 8,059,268 describe methods for inspecting workpiece surfaces using electromagnetic energy. These methods are based on scanning an object surface to obtain characteristics of an inspected object and other information concerning its surface. Variable scan speed and an effect of scattered light polarization are exploited to improve scanning performance. Several alternative scanning geometries are considered: (i) line scanning in mutually perpendicular X and Y directions, (ii) a circular scan geometry—circle-by-circle with step change in the diameter of every other circle, and (iii) Archimedes spiral scan. Line scanning implies instantaneous breaks and accelerations in scanning when X and Y directions need to be reversed. This slows down and adversely affects the precision of scanning processes, especially for objects with high mass and inertia. Motion interruptions are present as well in the method of a circular scan when the diameter of scanning is changed. Spiral scanning completely avoids interruptions because it is implemented in a continuous mode by concurrently spinning a characterized object and moving it at a constant speed laterally with respect to a probing beam on top. Spinning is a mechanically simple motion. It offers better positioning accuracy as well as reduced vibrations and transient forces compared to a fast interrupted motion along a straight line. Accordingly, a spiral scanning, i.e. Archimedes scanning, became a most efficient scanning method in high resolution and high throughput characterization systems.

There are numerous characterization methods and systems which use surface scanning based on spinning a characterized object while simultaneously moving it radially to the spin axis so that a probing beam spot on the surface of the object follows a path of the Archimedes spiral. Continuous efforts have been going on attempting to enhance throughput and precision of those methods and tools. For example, U.S. Pat. No. 7,522,290 describes a method and inspection apparatus for analyzing surface defects. An inspected object is scanned with two parallel laser probing beams. The phase difference between reflected beams is used to differentiate large area defects from small defects—particles. U.S. Pat. No. 5,712,701 discloses a surface inspection system and related method for inspecting the surface of a workpiece, detecting particles, defects, or other surface characteristics wherein a beam of a laser light is directed to the surface of the workpiece, the light is reflected off the surface, and both scattered and reflected light are collected to obtain information about the surface. U.S. Pat. No. 8,885,158 proposes an object inspection system with an optimized ratio between the speeds of different modes of object motion. U.S. Pat. No. 8,885,158 presents a method of inspection of surface defects with a continuous adjustment of the light intensity of a probing beam in order to enhance inspection sensitivity. U.S. Pat. No. 9,891,175 deals with a surface probing method that uses probing beams of light at oblique angles. It enables the detection of polarization-induced effects and monitoring of surface features related to diffraction effects.

A key drawback of characterization methods with Archimedes scanning is associated with a need to spin a characterized object at high speed. For example, to obtain a full parametric map on the surface of a 300 mm disk with a spatial resolution of 15 um, the radial movement of <15 um per every spin revolution is required. Accordingly, a spiral scanning of the entire area of the disk might be implemented with, at least, 10,000 spin revolutions. To complete the scan in 5 minutes, a high speed of object spinning needs to be greater than 2000 rpm. This is possible for small or light objects having a radial symmetry such as semiconductor wafers. Spiral scanning of large, heavy or unsymmetrical objects is possible only at relatively slow rotation that makes a characterization process impractically long. Even for applications of semiconductor wafer inspection, the expected future transition from 300 mm to 450 mm diameter wafers brings concerns of vibrations, losses of accuracy and safety issues at scanning with fast wafer spinning. Also, due to centrifugal forces, spinning may not be applied to characterization of research species deposited on top of supporting plates because the species may detach and fly off the plates. Therefore, high throughput scanning methods which do not require a fast motion of characterized objects are desired.

Another drawback of characterization methods with Archimedes scanning is large dimensions of characterization systems. Spinning stages need to have means to firmly hold a characterized object and to provide a linear motion of the object at a distance not less than a half of the object size. Accordingly, characterization tools are usually stand-along large units of equipment that cannot be easily integrated with production equipment and has a high cost of ownership in operations. Therefore, compact and inexpensive scanning tools are desired for characterization of workpieces.

SUMMARY OF THE INVENTION

The present invention provides a method and apparatus for characterizing objects having arbitrary shapes and sizes. Characterized objects may preferably have flat or nearly flat surfaces.

The present invention is directed to obtaining data and maps of distributions of characterized parameters on the surfaces of characterized objects.

The present invention is further directed to improving the throughput, sensitivity and resolution of characterization methods and apparatuses.

The present invention is further directed to reducing dimensions and cost of characterization tools.

The present invention is further directed to optimizing schemes of surface scanning. Several preferred scanning schemes are described in the embodiments of the invention.

The present invention is further directed to the designs of systems for directing probing beams of electromagnetic radiation. Several beam directing systems are described in the embodiments of the invention.

The present invention is further directed to the designs of characterization apparatuses. Several apparatus designs are described in the embodiments of the invention.

Other objects and features of the present invention will be in part apparent and in part pointed out hereinafter. The foregoing descriptions of the present invention and its embodiments serve to explain the concepts and principles of the invention. Explanations and illustrations do not restrict the scope of the invention.

DETAILED DESCRIPTION OF THE INVENTION AND ITS EMBODIMENTS

Proposed are a method and apparatus for characterizing objects by scanning them with beams of electromagnetic radiation. The said objects may be, but not limited to: metal, dielectric and semiconductor workpieces for manufacturing tools, machines, equipment or devices; mirrors and substrates with biological, medical and other research species on the surface. Preferably, said objects have flat or nearly flat surfaces. The said electromagnetic radiation may be, but not limited to: X-ray, ultraviolet light, visible light, infrared light, microwaves. The said characterization may be, but not limited to: imaging, visualization, mapping, sensing, probing, detecting surface features, inspection, measuring parameters and determining properties. The said characterization may be based on principles of reflection, refraction, scattering, absorption, polarization and interference of said beams of electromagnetic radiation at the surface or in the near surface regions of said objects. In other particular applications, the said characterization may be based on effects of photoluminescence or emission from the characterized objects caused by said beams of electromagnetic radiation. Said surface features may be, but not limited to: scratches, surface roughness, surface haze, particles on the surface, surface defects, cracks, biological and other research species deposited on supporting plates, the boundaries of crystalline grains, crystal orientation, inclusions, precipitates, fractions of different material phases, and chemical composition.

Objects with geometrically ideal flat surfaces may not exist in nature. The said flat surfaces imply surfaces or portions of the surfaces formed with no intentions of making them purposely curved and/or deviated from flat shapes. It is inferred that objects for characterization according to the present invention may have a plurality of surfaces and some of those may preferably be flat. The method and apparatus proposed in the present invention may be used for characterizing objects having non-flat surfaces as well but the quality of the characterization results, such as precision and resolution, may be affected.

A beam of electromagnetic radiation implies a directional projection of an electromagnetic energy radiating from a source of electromagnetic radiation. The said beam of electromagnetic radiation, called in the present invention also as a "probing beam", illuminates the surface of a characterized object at a beam spot. The size of the beam spot is a critical aspect of characterization methods. It is understood that actual beams of electromagnetic radiation do not have spatially abrupt intensity distributions or irradiance profiles. For example, lasers usually generate light beams with transverse magnetic and electric fields having amplitude profiles best described by the Gaussian function. A beam width may be mathematically defined in relation to "full width at half maximum" of the Gaussian distribution. The present description operates with the term of "beam width" and "beam spot size" implying transverse dimensions within which a major portion of the beam power is localized. For example, the major portion may constitute >50% of the beam power. For most applications of characterization methods according to the present invention, it is preferred to use compact probing beams having the beam power closely confined along the beam axes. In the further description, it is assumed that cross sections of probing beams have a round shape. The assumptions and approximations about the beam size and shape, as discussed above, are sufficient for implementing in practice the method and apparatus according to the present invention. Furthermore, for those skilled in optical and mechanical engineering, this would be a trivial task to adopt and accommodate any specific deviations from the beam shape without a failure to attain the benefits of the present invention.

Some of the essential differentiations of the present invention are achieved through a novel scanning concept that is based on dual concurrent motions realized in characterization methods and apparatuses. First, a spinning probing beam is provided that scans an object surface along a beam spot orbit. The system of probing beam spinning is preferably compact and the orbit of the probing beam spot is relatively small compared to a characterized object. The spinning speed is preferably high. The second concurrent motion is a relatively slow pulling of the orbit of a probing beam spot along the object surface by moving the object or/and the beam spinning system in a direction perpendicular to the axis of probing beam spinning.

The following are some of the essential benefits of the present invention. Due to uninterrupted spinning motion and small orbit of the probing beam spot, a high precision of beam spot positioning on the surface of the characterized object may be achieved. Compact systems of probing beam spinning allow very high spinning speeds. Fast spinning motion is not restricted by the size, shape or weight of characterized objects. Therefore, high throughput of characterization process may be achieved for arbitrary objects. Compact systems of probing beam spinning enable fabrication of inexpensive characterization apparatuses with small dimensions so that they may be easily integrated into production or processing equipment to provide an in-situ or in-process characterization capability.

Figure 1:
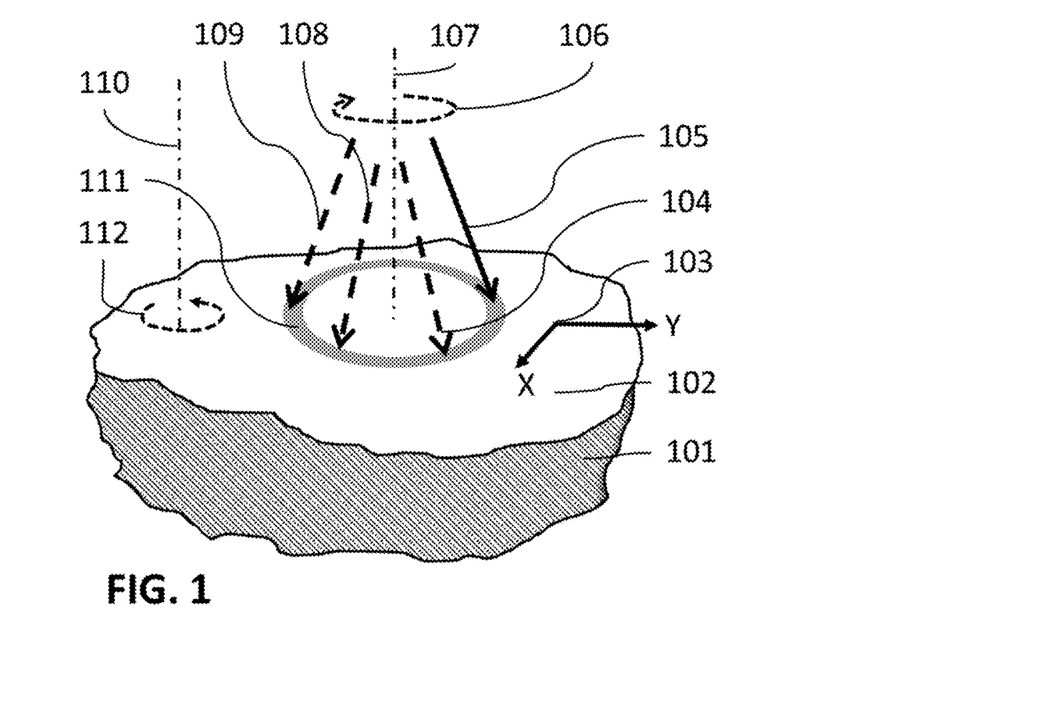
FIG. 1 is a depiction of the general concept of motions and mutual orientations of a characterized object and a probing beam in the methods and tools for characterization according to the present invention.

According to the present invention, as illustrated in FIG. 1, a characterized object 101 with a flat or near-flat surface 102 is scanned with a probing beam 105 that is spun about an axis 107 in a direction 106. The axis 107 is configured perpendicular to the object surface 102. During spinning, the probing beam 105 changes its position, some instantaneous positions are shown as dashed arrows 104, 108 and 109. The probing beam 105 illuminates the surface 102 with a beam spot that moves along a circular orbit 111 as the probing beam 105 spins. In the followed description, the orbit 111 is called as "beam spot orbit". Concurrently, the object 101 is continuously repositioned with respect to the axis 107 of probing beam spinning such that the surface 102 is maintained in the same geometric plane. This means object repositioning is conducted perpendicular to the axis 107. A preferred object repositioning is a continues or step-by-step linear motion in a Cartesian coordinate system 103 associated with the object surface 102. For example, this may be a motion along mutually perpendicular directions X and Y. Another preferred repositioning of the object 101 is its rotation about an axis 110 in a direction 112. The axis 110 of object rotation may preferably be perpendicular to the object surface 102 but it must not coincide with the axis 107 of probing beam spinning. The rotational repositioning may especially be beneficial for characterizing objects with axial symmetry, such as round disks and rings. A combination of rotation and linear repositioning may be applied.

The probing beam 105 may be oblique with respect to the surface 102 of the characterized object 101. In other embodiments, the probing beam 105 may be arranged perpendicular to the object surface 102 but it must be remote from the axis 107 of probing beam spinning. The probing beam 105 and the axis 107 of its spinning may be in one geometric plane or different plains. The spinning direction 106 and the rotation direction 112 may be independently chosen clockwise or counterclockwise. The directions 103 of linear object repositioning with respect to the axis 107 of probing beam spinning may be implemented by moving the object 101 while keeping the axis 107 stationary or by moving the probing beam spinning system while keeping the object 101 stationary. A combination of simultaneous movements of the object 101 and the axis 107 may be applied. In the further description, either option of object repositioning with respect an axis of probing beam spinning is called "movement of a characterized object" or "object movement" for simplicity. Most benefits from the present invention may be obtained with a high spinning rate of the probing beam 105, which provides a fast speed of surface scanning, and relatively slow object movement that allows characterization of arbitrary objects using essentially the same characterization apparatus.

A preferred angles of incidence of the probing beam on the surface of a characterized object range from 0 to 60°. At the angles of incidence greater than 60°, a beam spot on the surface of an object spreads. As a result, the resolution of a characterization may be compromised. In some characterization applications, however, larger angles incidence of probing beams may be chosen to enhance the method sensitivities to specific surface features.

A resolution of characterization methods according to the present invention may greatly depend on the width of a probing beam at the surface of a characterized object. A preferred way for reducing the width of a probing beam is its focusing. Among conventional and cost-effective solutions, most prominent results on focusing beams of electromagnetic radiation have been achieved for radiation within the spectrum from 10 nm to 1400 nm of ultraviolet, visible, and infrared light.

Figure 2:
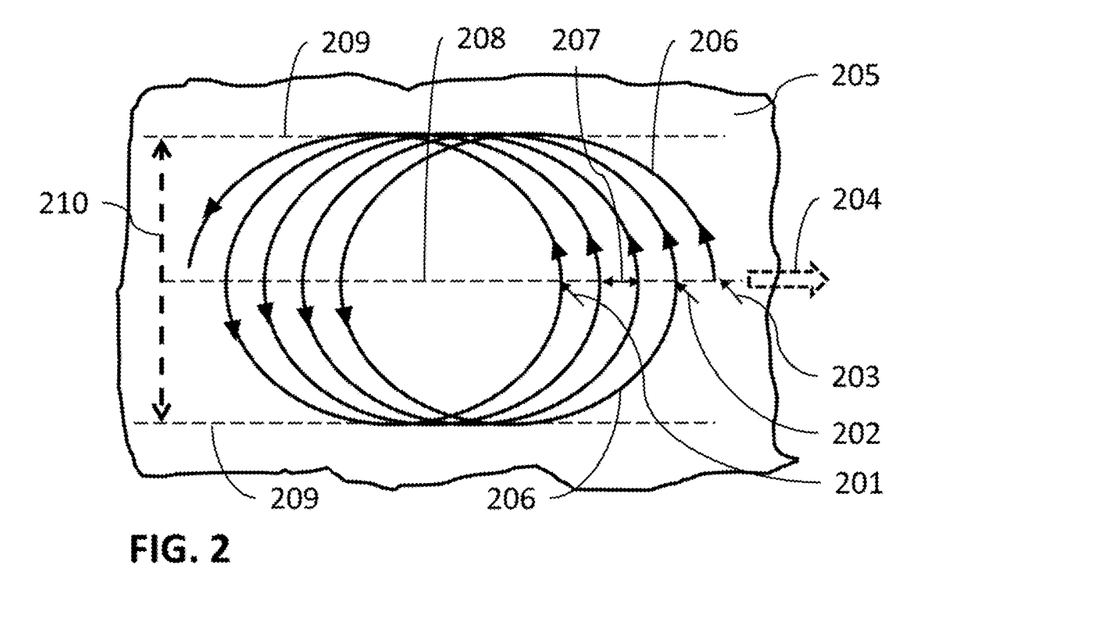
FIG. 2 is a depiction of a route of a probing beam spot on the surface of a characterized object in case of an uninterrupted linear movement of a characterized object with respect to the axis of probing beam spinning.

FIG. 2 illustrates an example of a scanning pattern of a probing beam according to the present invention. A top view of a surface 205 of a characterized object is shown. A probing beam is spun counterclockwise white the characterized object is moved with a constant speed along a straight line in the direction 204. Accordingly, the probing beam spot on the surface 205 follows a path 206. The path of the probing beam spot starts at the initial beam position 203 and follows a circle that progressively shifts on the surface 205 to the left at a distance 207 during every revolution of the spinning probing beam. In particular, the first revolution of the spinning probing beam brings the probing beam spot to the position 202. The position 201 is reached by the probing beam in four revolutions of its spinning. On its way, the projection of the axis of probing beam spinning to the surface 205 follows the line 208 in the direction opposite to the direction 204 of object movement. The continuing process of the beam spot spinning and shifting executes a scanning of the portion of the surface within the band having boundaries 209. The width 210 of the scanning band equals to the diameter of the beam spot orbit that is drastically larger than the width of a beam spot. Therefore, even though the speed of the object movement 204 may be relatively slow, the provided scanning pattern results in a high throughput of the characterization process.

A probing beam continuously interacts with a characterized object within the area of a beam spot on the surface of an object. This interaction results in a secondary electromagnetic radiation. According to the present invention, at least a portion of the secondary electromagnetic radiation is collected and analyzed to determine and quantify characteristic signals related to the characterized object. Then, the values of the characteristic signals are recorded along with the coordinates or with the reference to the coordinates of the beam spot from which the secondary electromagnetic radiation was collected. The recording may be continuous with an implementation using an analog form. For the convenience of processing, presenting and storing the characterization data, this is preferred to record the characteristic signals in a digital form at some frequency.

Figure 3A:
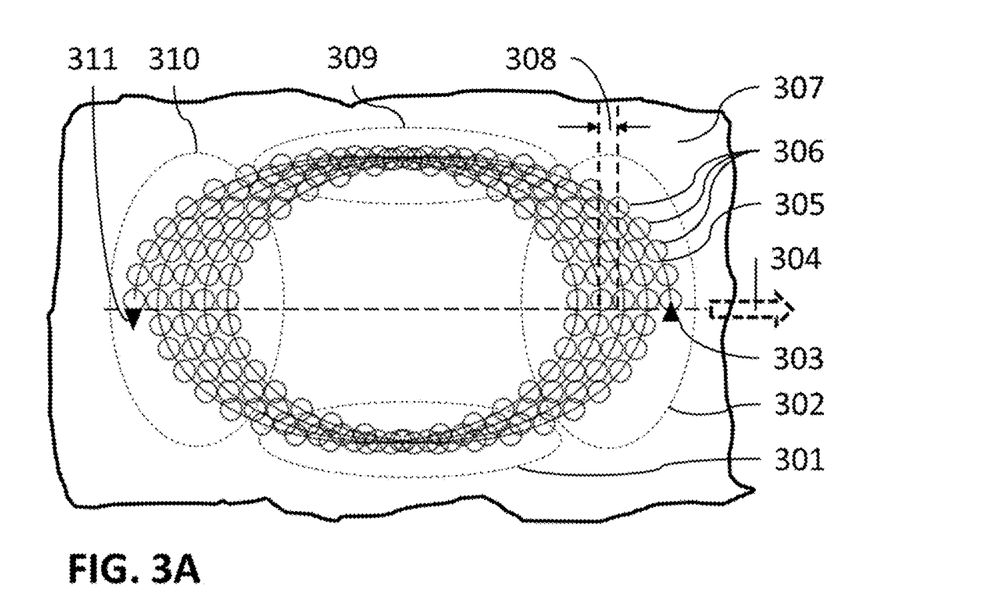
FIGS. 3A, 3B, 3C and 3D illustrate progressive instantaneous positions of probing beam spots on the surface of a characterized object in case of an uninterrupted linear movement of a characterized object with respect to the axis of probing beam spinning.

In many characterization applications it is important to ensure that the probing beam scans the surface without gaps so that the secondary electromagnetic radiation is collected and analyzed from the entire intended portion of the surface of a characterized object. To meet this objective, an alignment is required between the width of a probing beam, the size of beam spots on the object surface, the speed of probing beam spinning and the speed of object movement with respect to the spin axis of a probing beam as explained in FIG. 3A, FIG. 3B and FIG. 3C. These figures depict a top view of a surface 307 of a characterized object. The object is moved straight along a direction 304 with a constant speed. A spinning probing beam forms a beam spot on the object surface that follows the path 305 from its initial position 303 to the final position 311. The beam spot orbit shifts left by the distance 308 with every revolution of the spinning probing beam. This shift is equal to the distance of object movement in the direction 304 during the time of one spinning revolution of the probing beam. The secondary electromagnetic radiation is collected, analyzed, and its characteristic signals are recorded at a constant frequency. Circles along the scanning path 305, such as circles 306, show the instantaneous positions of the probing beam spots at which the characteristic signals of the secondary electromagnetic radiation are recorded. In FIG. 3A, the circles cover most of the scanned portion of the object surface 307 with minimal gaps. Therefore, an intended characterization may satisfactory represent the entire scanned area of the surface 307.

Figure 3B:
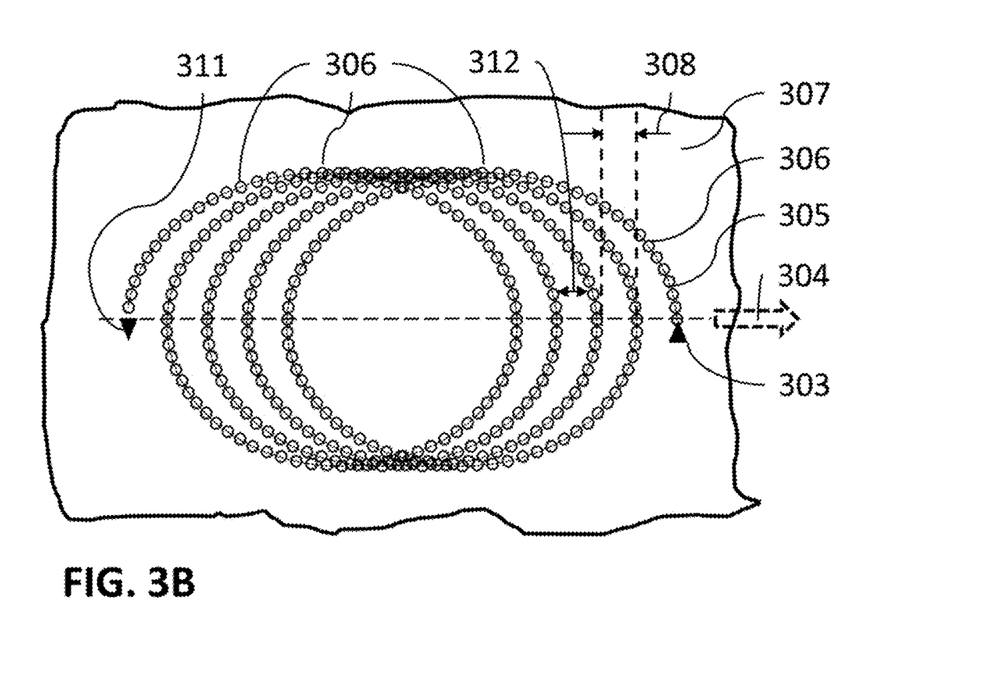
Figure 3C:
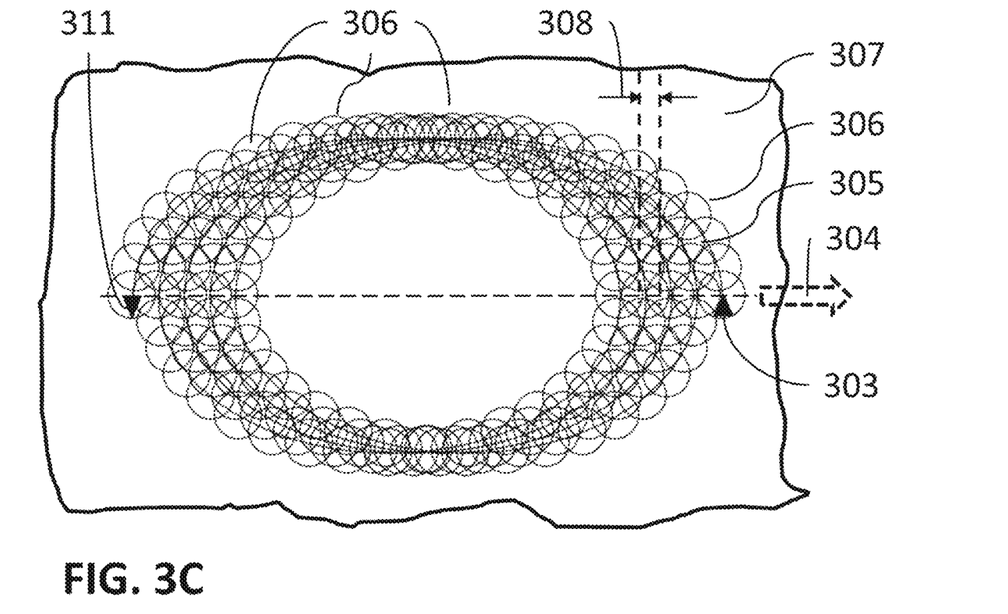

In FIG. 3B, the instantaneous beam spots 306, corresponding to the records of characteristic signals, provide continuity along the scanning path 305 of the probing beam spot. However, there are significant gaps 312 between the beam spot orbits because of a misalignment between the beam spot sizes, the speed of probing beam spinning and the object moving speed. The results of the corresponding characterization will miss data from the object areas omitted by scanning. FIG. 3C shows a case with a significant overlap between adjacent instantaneous positions 306 of beam spots at which characteristic signals are recorded. This guarantees that the entire scanned area 307 is characterized. Such an overlap improves the precision of characterization. A spatial resolution of characterization in this case may be better than the size of probing beam spots on the object surface.

In the method of characterization according to the present invention, the density of collected characteristic signals on the surface of the characterized object is not uniform. In particular, the scanning may create a redundancy or duplication of characterization data. As can be seen in FIG. 3A, the density of instantaneous beam spots corresponding to the records of characteristic signals is higher in the areas 301 and 309 of the scanning band. In general, at a constant frequency of collection, analysis and recording of the characterization data, the density of the data is higher at the edges of the scanning band. Also, in the process of scanning along an extended scanning band, the surface of an object is scanned twice—first, by the front portions 310 and then by the tailing portions 302 of the beam spot orbit. The conversion of actual characterization data to any system of coordinates on a surface of a characterized object, such as a Cartesian coordinate system, is a trivial task. Various approaches, such as eliminating redundant data points of averaging the values of characteristic signals, may be applied. At the same time, the redundancy of data provides an opportunity to reduce noise-to-signal ratio and may be used for improving the accuracy of a characterization.

Figure 3D:
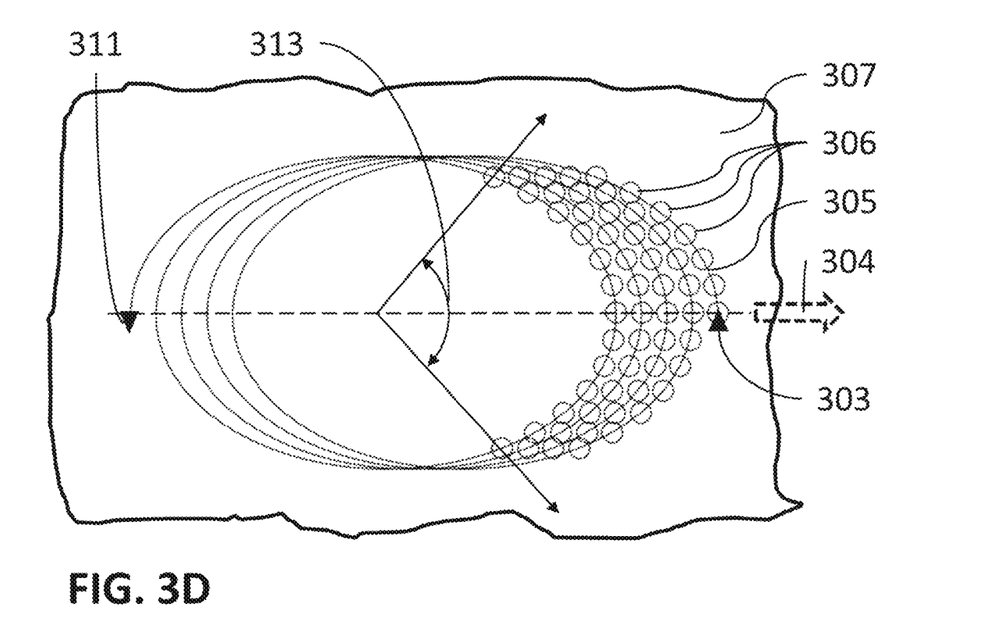

Optionally, the redundancy of scanning may be reduced or eliminated by collecting, analyzing and recording characterization signals of a secondary electromagnetic radiation only from a specific sector of a beam spot orbit. This embodiment is illustrated in FIG. 3D. On a surface 307 of a characterized object, a probing beam spot follows a path 305 from its initial position 303 to its final position 311. The path 305 is set by the probing beam spinning and the object movement in the direction 304. Small circles 306 show locations of beam spots corresponding to the instances of collection, analysis and records of characteristic signals of the secondary electromagnetic radiation. The records are implemented only within a sector 313 of the beam spot orbit. This reduces or eliminates the spatial overlap in the collection of the characterization data. Limiting a number of records of characteristic signals is also a trivial task that may be easily completed by modifying data collection protocol or by reducing collected data in the characterization methods according to the present invention. Therefore, the following description will not further emphasize the aspects of data redundancy.

In order to improve a spatial resolution of characterization according to the present invention, it is preferred to provide a narrower probing beam. This may be achieved by focusing a primary beam of an electromagnetic radiation onto the surface of a characterized object. However, a preferred width of a probing beam may be chosen in a consideration that the reduction of the width may adversely affect the throughput of characterization targeting the same surface area of a characterized object. The throughput of characterization is proportional to the speed of spinning of a probing beam determined by capabilities of a characterization apparatus. After providing a probing beam with a preferred and/or available width and setting a speed of probing beam spinning, a selection is made for the frequency of collection, analysis and records of characteristic signals of secondary electromagnetic radiation. Finally, a selection is made for the speed of repositioning the characterized object with respect to the axis of probing beam spinning. The present invention establishes the following selection criteria for the frequency F of collection, analysis and records of characteristic signals of secondary electromagnetic radiation in Hz (Hertz) and for the speed V of characterized object movement with respect to the axis of probing beam spinning in mm/min:

$$F \geq 0.05 \cdot D \cdot S/W \text{ and}$$

$$V \leq S \cdot W/\cos(A),$$

where
D is the diameter of the beam spot orbit in mm;
S is the speed of probing beam spinning in rpm (revolutions per minute);
W is the width of the probing beam at the surface of a characterized object in mm;
and A is the angle between the probing beam and the axis of its spinning.

Figure 4:
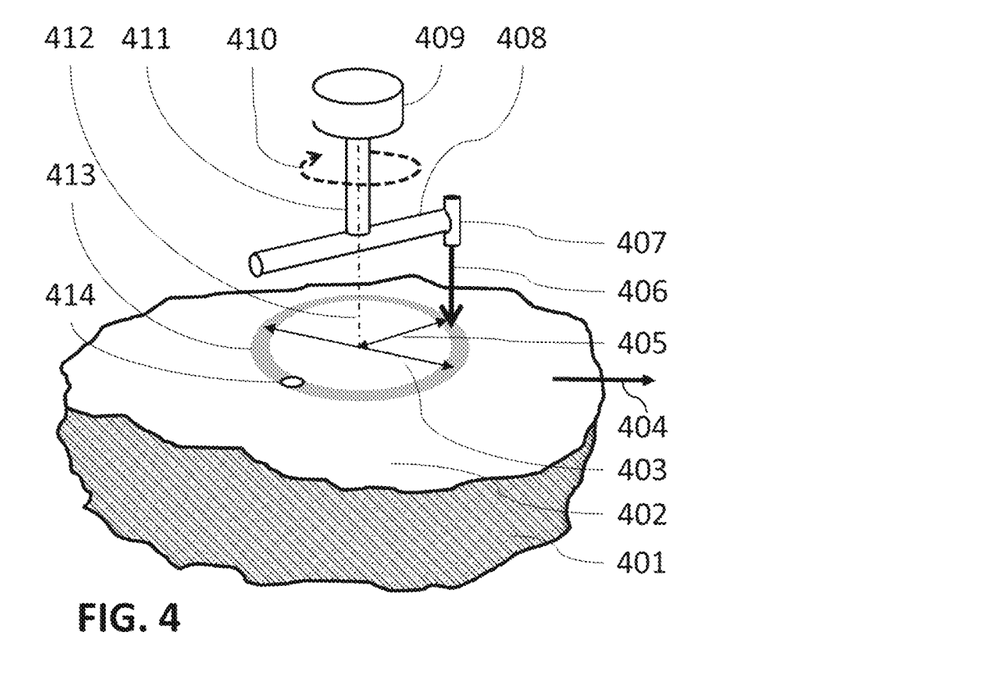
FIG. 4 illustrates an embodiment of a beam directing system in a characterization apparatus according to the present invention.

FIG. 4 shows an embodiment of a beam directing system of a characterization tool according to the present invention. A laser diode 407 is used as a source of electromagnetic radiation. It is fastened to a rod 408 attached in a fixed relation to a shaft 411 of a step motor 409. The motor 409 spins its shaft 411 with the rod 408 and the laser diode 407 about the axis 412 in a direction 410 at the speed of 6000 rpm. The axis 412 is perpendicular to the surface 402 of the characterized object 401. The object 401 is moved along a straight line in the direction 404. The laser diode 407 provides the probing beam 406 parallel to the spin axis 412. The probing beam 406 illuminates the surface with a beam spot that spins along the orbit 413. An instantaneous beam spot 414 is shown. The diameter of the beam spot is 0.025 mm (25 µm). The radius of the beam spot orbit 413, i.e. the distance 405 between the probing beam 406 and the spin axis 412, is 50 mm. Therefore, the diameter 403 of the beam spot orbit 413 is 100 mm. The criteria for preferred parameters of the characterization process provide:

$$F \geq 0.05 \cdot 100 \cdot 6{,}000/0.025 = 1{,}200{,}000 \text{ Hz and}$$

$$V \leq 6{,}000 \cdot 0.025/\cos(0) = 150 \text{ mm/min.}$$

Accordingly, the frequency F of 2.5 MHz is selected for collecting, analyzing and recording characteristic signals during the characterization process. The speed V of 70 mm/min is chosen for moving the characterized object 401 in the direction 404 with respect of the beam spinning axis 412.

Figure 5:
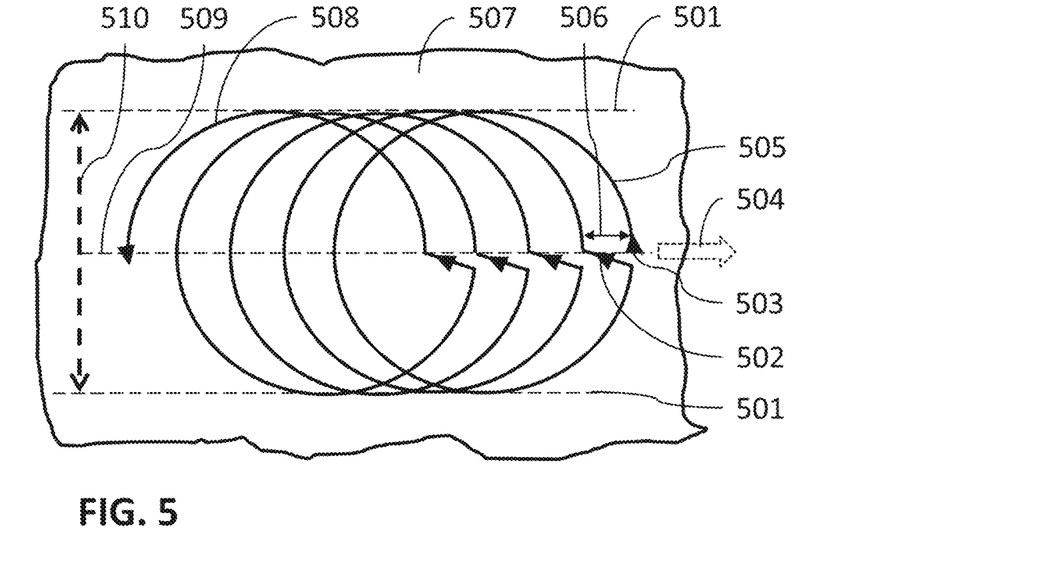
FIG. 5 is a depiction of a route of a probing beam spot on the surface of a characterized object in case of linear movement of a characterized object by steps with respect to the axis of probing beam spinning.

A motion of a characterized object with respect to a probing beam directing system may be executed by steps instead of or in a combination with a nonstop repositioning. In this case, it is preferred to align the steps of the object motion with the probing beam spinning. For example, every subsequent step of the object movement may be triggered by the completion of a revolution of a probing beam around the axis of its spinning as explained in FIG. 5. A probing beam spot starts scanning the surface 507 of a characterized object with its first orbit 505 at the location 503 and follows a path that ends, for the illustration, with its fifth orbit 508. At the instance when the beam spot on its first orbit approaches an immediate proximity to its starting location 503, the object is moved in the direction 504 by the distance 506. This leads to the shift 502 of the probing beam spot to the second orbit. The scanning continues in the same way with every other orbit of the probing beam spot shifting in the direction opposite to the direction 504 of object movement. Such an alignment between the object motion and the probing beam rotation simplifies the synchronization between characteristic signals and the instantaneous coordinates of the beam spot at which characteristic signals are recorded. Analogous to the previous examples, the projection of the axis of probing beam spinning on the characterized surface follows the straight line 509 and scanning is implemented within a band having boundaries 501 and the width 510.

The present invention establishes the following criteria for selecting the parameters of scanning in the disclosed method of characterization in case of using step motions for repositioning a characterized object with respect to a probing beam directing system:

$$F \geq 0.05 \cdot D \cdot S/W \text{ and}$$

$$Q \leq W/\cos(A),$$

where
F is the frequency of a collection, analysis and records of characteristic signals in Hz (Hertz);
D is the diameter of the beam spot orbit in mm;
S is the speed of a probing beam spinning in rpm (revolutions per minute);
W is the width of the probing beam at the surface of the characterized object in mm;
Q is the length of steps of object moving in mm;
and A is the angle between the probing beam and the axis of its spinning.

Figure 6:
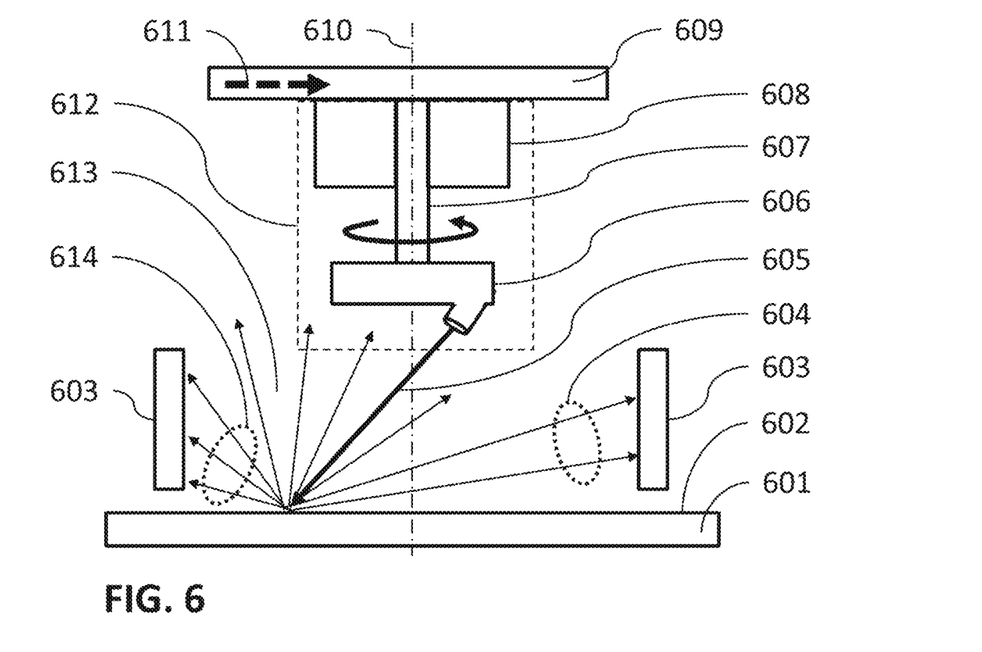
FIG. 6 illustrates an embodiment of a scanning module of an X-ray fluorescence characterization system.

For example, FIG. 6 depicts a scanning module of an X-ray fluorescence characterization system. An X-ray source 606 provides the probing beam 605 of X-ray radiation and directs it to the surface 602 of a characterized object 601 at an angle of 45 degrees. The X-ray source 606 is fastened to the shaft 607 of the motor 608 that spins the X-ray source 606 about the axis 610 at the speed of 120 rpm. The diameter, i.e. width, of the probing beam at the surface 602 is 2 mm. As the X-ray source is spun, the probing beam spot on the surface 602 follows a circular orbit with the diameter of 150 mm. The characterized object is positioned stationary. The beam directing system 612, comprised of the motor 608 and the spinning X-ray source 606, is attached to a moving table 609. The moving table 609 repositions the beam directing system 612 in the direction parallel to the surface 602 by controlled steps 611. The probing beam 605 generates the secondary X-ray radiation 613. The portions 604 and 614 of the secondary radiation 613 are collected and analyzed by a ring array of X-ray detectors 603 which provide a quantified value of a characteristic signal of the secondary electromagnetic radiation 613. The criteria for preferred parameters of scanning in the characterization process provides:

$$F \geq 0.05 \cdot 150 \cdot 120/2 = 450 \text{ Hz and}$$

$$Q \leq 2/\cos(45°) = 2.8 \text{ mm}.$$

Accordingly, a frequency of 500 Hz is selected for the collection, analysis and records of the characteristic signal. The size 1 mm is chosen for the moving steps 611 of the beam directing system 612 along the surface 602 of the characterized object 601.

Figure 7:
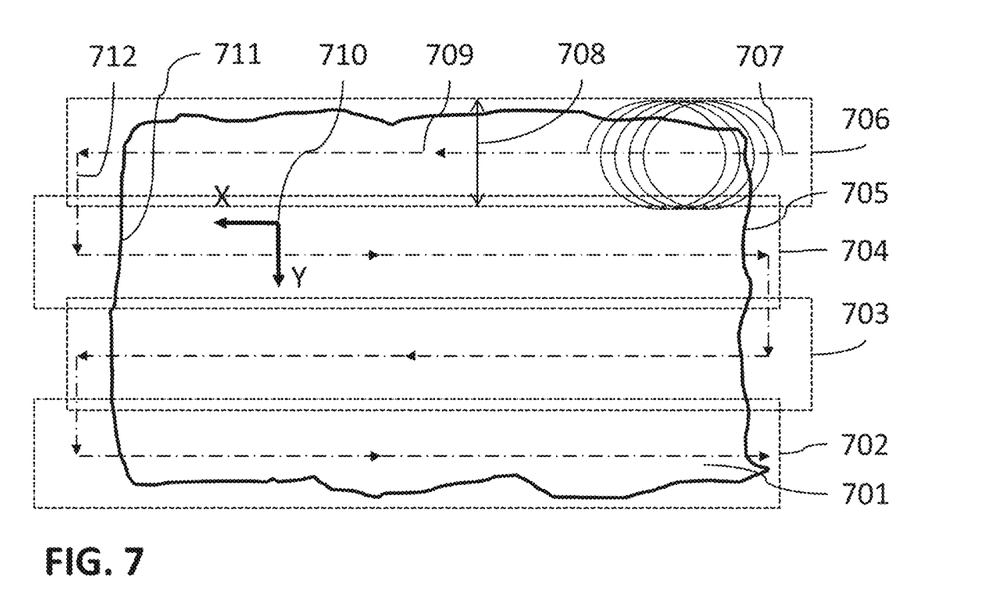
FIG. 7 illustrates an embodiment of a preferred scanning scheme that includes multiple scanning bands for characterizing large objects.

For characterizing large objects according to the present invention, methods and apparatuses with a variety of scanning schemes may be applied. FIG. 7 provides an example of a preferred scanning scheme for large objects through multiple scanning bands to cover the entire object surface. Optionally, as shown in FIG. 7, the scanning bands may overlap. A characterized object with a surface 701 is progressively moved along X axis of the Cartesian X-Y coordinate system 710. A spot of a spinning probing beam starts surface scanning from the first edge 705 of the surface 701 and follows a shifting spiral path 707. Only a beginning portion of the path 707 is shown. The scanning goes along a first scanning band 706 that has a width 708 equal to the diameter of the beam spot orbit. During the process of scanning, the axis of probing beam spinning moves along the center line 709 of the scanning band 706. When the beam spot orbit reaches the opposite edge 711 of the surface 701, the object is moved along Y direction at a distance 712 that is less than or equals the scanning band width 708. Next, the object is progressively moved opposite to X direction of the X-Y coordinate system 710 until it reaches the first edge 705 of the surface 701 and completes scanning the second band 704. Such a meander scanning continues through the scanning band 703. The scanning finishes after passing through the scanning band 702. The scanning bands 706, 704, 703 and 702 cover the entire surface 701 of the characterized object.

Figure 8:
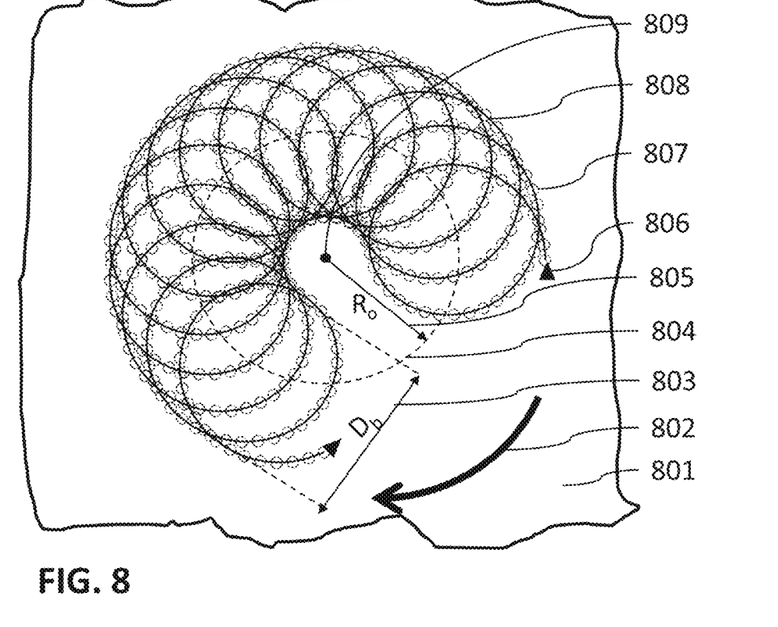
FIG. 8 is a depiction of a route of a probing beam spot on the surface of a characterized object in case of rotational movement of the object with respect to the axis of probing beam spinning.

In some applications of the present invention, this may be preferred to apply a rotational movement of a characterized object with respect to a beam directing system. In particular, this approach may enhance a throughput of characterizing objects with round shapes, such as disks or rings. Another benefit is a further reduction of dimensions of characterization apparatuses that may be achieved. An embodiment with a rotational movement of a characterized object is illustrated in FIG. 8. A characterized object with a surface 801 is rotated about the rotation axis 809. The rotation axis 809 is perpendicular to the object surface 801. A direction 802 of object rotation in this example is arbitrary chosen clockwise. It may be counterclockwise in other embodiments. A beam directing system of the characterization apparatus spins a probing beam about an axis configured perpendicular to the object surface 801. The axis of probing beam spinning is positioned at a distance 805 ($R_0$) from the axis 809 of object rotation. Due to progressive clockwise rotation of the object, the axis of probing beam spinning follows a counterclockwise path along the circle 804 on the surface 801. The probing beam illuminates the object surface 801 at a beam spot that follows the path 808 shown as a solid spiral line starting from the position 806 of a beam spot at the beginning of characterization. The probing beam produces a secondary electromagnetic radiation. It is collected and its characteristic signals are analyzed and recorded at instantaneous beam spot positions shown as small circles 807 along the path 808 of the probing beam spot. The scanning proceeds along a ring band having a width 803 ($D_b$). The ring band has the inner diameter $R_0-D_b/2$ and the outer diameter $R_0+D_b/2$.

The present invention establishes the following criteria for selecting the frequency of collecting, analyzing and recording characteristic signals of the secondary electromagnetic radiation and for the speed of object rotation with respect to the system that spins and directs a probing beam:

$$F \geq 0.05 \cdot D \cdot S/W \text{ and}$$

$$P \leq 0.16 \cdot S \cdot W/(R \cdot \cos[A]),$$

where
F is the frequency in Hz (Hertz), of collecting, analyzing and recording the characteristic signals; D is the diameter of the beam spot orbit on the object surface in mm;
S is the speed of probing beam spinning in rpm;
P is the speed of object rotation in rpm (revolutions per minute);
W is the width of the probing beam at the surface of a characterized object in mm;
R is the distance between the axis of the probing beam spinning and the axis of object rotation;
and A is the angle between the probing beam and the axis of its spinning.

Figure 9:
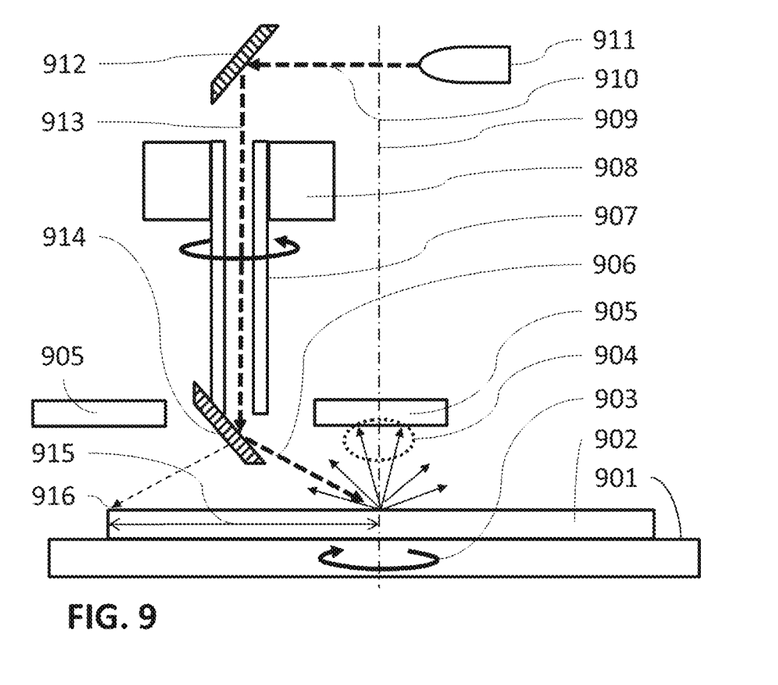
FIG. 9 illustrates an embodiment of a characterization apparatus for inspecting surface quality of semiconductor wafers.

For example, as shown in FIG. 9, a 300 mm semiconductor wafer 902 is inspected on surface defects using a characterization tool according to the present invention. The tool utilizes a probing EUV (extreme ultra violet) beam 910 that is provided by an external EUV source 911. A beam directing system comprises a motor 908 and a reflecting mirror 914. The motor 908 has a hollow shaft 907 arranged perpendicular to the surface of the wafer 902. The reflecting mirror 914 is affixed to the shaft 907. The primary EUV beam 910 is reflected by a stationary mirror 912, goes along the axis 913 of motor spinning through the hole in the shaft 907, hits the reflecting mirror 914 and gets directed towards the surface of the wafer 902 as an intended probing beam 906. The motor 908 spins the mirror 914 and the probing beam 906 at the speed of 6000 rpm. The angle between the probing beam and the axis of its spinning is 60 degrees as set by the tool design. The beam width at the wafer surface is 50 microns, i.e. 0.05 mm. The diameter 915 of the orbit of the probing beam spot on the wafer surface is 150 mm that equals to the radius of the characterized wafer 902. A portion 904 of a scattered optical radiation is collected by a photodetector array 905 assembled in a ring that is positioned symmetrically around the motor shaft 907. The photodetector array measures the intensity of the scattered optical radiation to differentiate surface defects by their sizes. The wafer 902 is rotated in a direction 903 about the axis 909 that intersect the center of the wafer. The beam spinning axis is the axis of motor spinning. It is positioned perpendicular to the wafer surface at the distance of 75 mm from the center of the wafer 902. Therefore, the orbit of the probing beam spot on the wafer surface is extended from the center of the wafer 902 to the wafer edge 916. The entire wafer surface may be characterized in one revolution of the wafer that is with one scanning band, i.e. a scanning ring. According to the established criteria of selecting scanning parameters of a characterization with rotational object motion:

$$F \geq 0.05 \cdot 150 \cdot 6000/0.05 = 900,000 \text{ Hz and}$$

$$P \leq 0.16 \cdot 6000 \cdot 0.05/(75 \cdot \cos[60°]) = 1.28 \text{ rpm.}$$

Accordingly, a frequency of 1 MHz is selected for the collecting and recording the scattered EUV light. The wafer rotation is set at the speed of 1 rpm meaning that the full characterization of the wafer can be accomplished in 1 minute.

Figure 10:
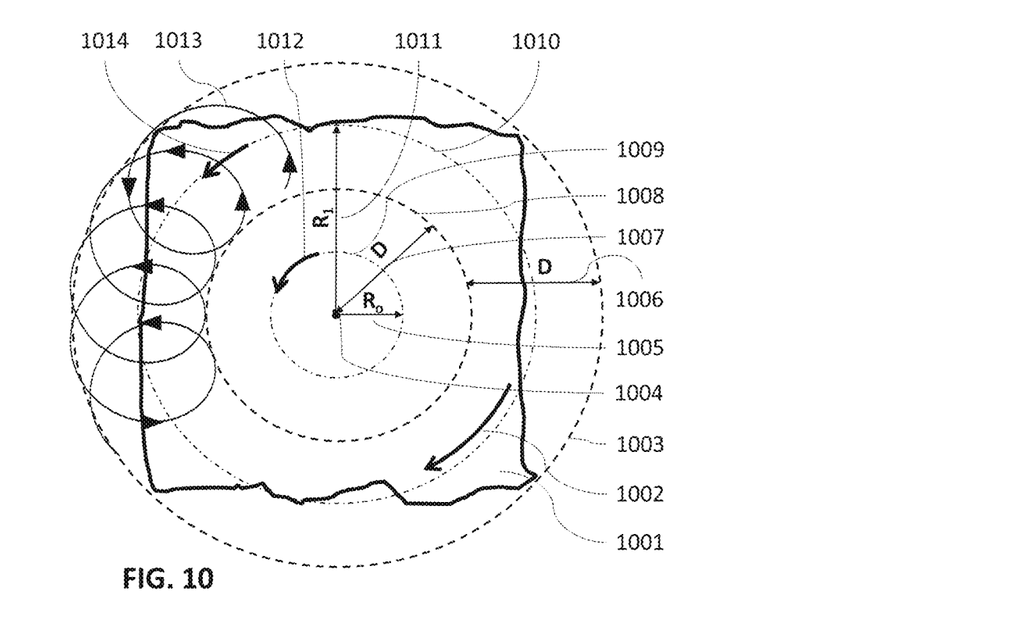
FIG. 10 illustrates an embodiment of a preferred scanning scheme that includes multiple scanning ring bands for characterization methods which apply rotational movement to characterized objects.

A rotational motion of a characterized object with respect to a probing beam directing system, according to the present invention, is applicable as well for characterizing arbitrary large objects. The example illustrated in FIG. 10 explains a preferred approach that involves scanning along multiple ring bands. A characterized object with a surface 1001 is in a state of progressive rotation 1002 clockwise about the axis 1004 perpendicular to the surface 1001. A probing beam directing system in a characterization apparatus spins a probing beam about an axis that is also perpendicular to the surface 1001. An orbit of a probing beam spot on the surface 1001 has the diameter D. First, the axis of probing beam spinning is positioned at the distance 1011 ($R_1$=1.5 D) from the rotation axis 1004. Due to the object rotation in the direction 1002, the axis of the probing beam spinning follows on the surface 1001 a circular path 1010 in the direction 1014 opposite to the direction 1002 of object rotation. A probing beam spot on the surface 1001 follows a spiral path 1013 having a width 1006 that equals D. The scanning of the surface 1001 is executed along a ring band with the inner border 1008 and the outer border 1003. This part of scanning and a corresponding characterization process gets completed with a full revolution of the object. Then the characterized object is repositioned with respect to the probing beam such that the distance 1005 between the axis of object rotation and the axis of probing beam spinning is reduced by D and becomes $R_0$=0.5 D. Analogously, during the next full revolution of the characterized object, the axis of probing beam spinning follows the circle path 1009 in the direction 1012. During this revolution of the object, the scanning and the characterization is executed over the surface circle area within the outer border 1008. Therefore, with two revolutions of object rotation, the overall scanning and characterization is accomplished over the whole surface 1001 of the characterized object. The illustrated approach allows increasing the diameter of the scanned circle area by 2D with every revolution of the characterized object. Optionally, after completing scanning along one ring band, the distance between the axis of object rotation and the axis of probing beam spinning may be changed by a value less than the diameter of the beam spot orbit D. This may improve the stitching of characterization data between the scanning ring bands because of their overlap. However, the throughput of scanning and characterization in this case may be reduced.

Figure 11:
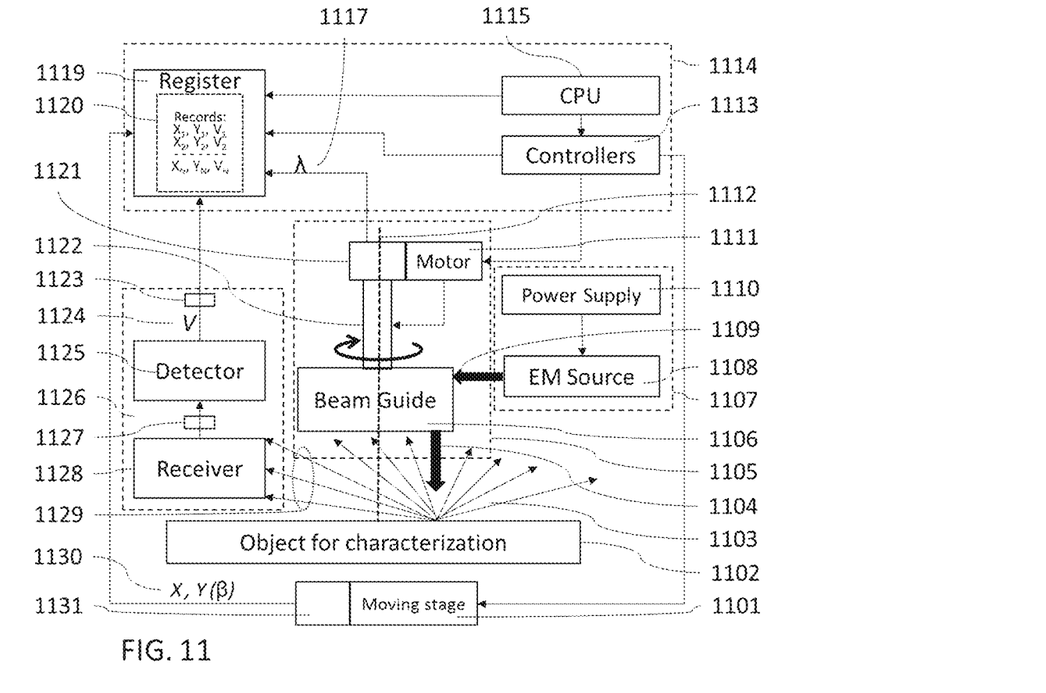
FIG. 11 is a depiction of a block diagram of a characterization apparatus according to the present invention.

Further, the apparatus for characterizing objects according to the present invention is disclosed. The key components of the apparatus and principles of its operation are illustrated in FIG. 11. The apparatus comprises a system 1107 that generates an electromagnetic radiation, a beam directing system 1105, a moving stage 1101, an analytical system 1126 and a computer system 1114. The system 1107 generating an electromagnetic radiation includes a source 1108 of electromagnetic radiation and a power supply module 1110. The source 1008 of electromagnetic radiation is empowered by the power supply module 1110 and provides a primary beam 1109 of electromagnetic radiation. The beam directing system 1105 includes a beam guiding unit 1106 that forms a probing beam 1104 by directing the primary beam 1109 of electromagnetic radiation onto the surface of a characterized object 1102. Also, the beam directing system 1105 includes a motor 1111 that spins the beam guiding unit 1106 and the probing beam 1104 of electromagnetic radiation by a shaft 1122 with an encoder 1121. The analytical system 1126 includes a receiving device 1128 and a detecting device 1125. Optionally, it may have a first conveying device 1127 and a second conveying device 1123. The computer system 1114 includes a data processing module 1115, a controller module 1113 and a data recording module 1119. The controller module 1113 controls the motions of the motor 1111 and the moving stage 1101.

Still referring to FIG. 11, the axis 1112 of spinning of the beam guiding system 1106 is perpendicular to the surface of the characterized object 1002. The first encoder 1121 detects an angular position 1117 ($\lambda$) of the probing beam 1104 and feedbacks its value A to a recording device 1119. The moving stage 1101 repositions the object 1002 with respect to the beam directing system 1105. The movement is implemented perpendicular to the axis 1112 of probing beam spinning. A moving stage encoder 1131 detects the position 1130 (X, Y or $\beta$) of the object 1102 and communicates it to the recording module 1119 of the computer system 1114. The probing beam 1104 instigates the secondary electromagnetic radiation 1103 that emanates from the object 1002. The receiving device 1128 collects at least a portion 1129 of the secondary electromagnetic radiation 1103. The first conveying device 1127 delivers the collected electromagnetic radiation to the detecting device 1125 that measures the secondary electromagnetic radiation and provides a characteristic signal 1124 (V) that carries an information about specific parameters of the secondary electromagnetic radiation as intended in the purpose of characterization. The second conveying device 1123 receives the characteristic signal 1124 (V) from the detecting device 1125 and communicates it to the recording module 1119. Depending on a design option for the apparatus according to the present invention, some or all of the four components of the analytical system 1126 may be combined in one integrated device. For example, if a secondary electromagnetic radiation is a reflected light and its characteristic signal is the light intensity, then the whole analytical system may be represented with a single photodetector that receives the secondary electromagnetic radiation and provides an output current as a measure of the light intensity. At a device level, of course, the architecture of a single photodetector includes a receiving window, some media that conveys the light to a detecting element, such as a semiconductor P-N junction, and output terminals playing the role of the second conveying element.

Still referring to FIG. 11, the recording module 1119 receives and synchronously records the data 1120 including the angular position 1117 of the probing beam 1106 with respect to the axis 1112 of its spinning, the coordinates 1130 of the object surface with respect to the spin axis 1112, and quantified values of the characteristic signal 1124. An instantaneous position ($X_i$, $Y_i$) of the probing beam spot in a coordinate system of the object surface is specifically defined by the angular position 1117 of the probing beam 1104 and the object movement coordinates 1130. Therefore, positions ($X_i$, $Y_i$) of beam spots in the coordinate system of the object surface may be calculated by the data processing unit 1115 and recorded as the characterization data 1120 instead of recording the angular position 1117 and coordinates 1130 of the object movement. This recording continues with a chosen frequency along with the scanning motion of the probing beam spot on the surface of the object 1102. The recording system 1119 synchronously records every characteristic signal ($V_i$) and the corresponding coordinates ($X_i$, $Y_i$) of the probing beam spot at which the characteristic signal ($V_i$) is received. Continuous records 1120 made in the process of surface scanning provide a necessary and sufficient information about the distributions of characteristic signals within the scanned area of the object surface. The scanned area is defined by the combined motions of the probing beam 1104 and the object 1101. Both motions are set in a controlled and predetermined way by the module 1113 of controllers. An intended characterization plan, i.e. a scanning recipe, is loaded in the computer system 1115 that instructs the controller system 1113 to execute a scanning path and a frequency of recording of characteristic signals as specified in the recipe.

Still referring to FIG. 11, the moving stage 1101 may hold the characterized object 1102 and move it while the axis 1112 of probing beam spinning is kept stationary. Alternatively, the moving stage 1101 may support the beam directing system 1105 and move it while the object 1102 is preserved stationary. Both options provide the desired result of moving the object 1102 with respect to the beam spinning axis 1112. Some applications of an apparatus for characterizing objects according to the present invention may find it beneficial to provide simultaneous movements of both a characterized object and a beam directing system. The encoder 1121 may be an integral part of the motor 1111, a split encoder on the shaft 1122 or any other device that indicates angular positions of the probing beam 1104 with respect to the axis 1112 of its spinning. The encoder 1131 may also be any standard device, such as encoders on linear actuators driving the moving stage 1101, or an application-specific instrumentation that identifies and communicates positions 1130 of the moving stage 1101. A preferred movement scheme of the moving stage 1101 is based on linear repositioning along mutually perpendicular directions in a Cartesian coordinate system (X, Y) associated with the surface on a characterized object. Another preferred movement scheme is a rotation, at which angular positions ($\beta$) of the characterized object 1102 are identified and communicated from the encoder 1131 to the recording system 1119.

Yet referring to FIG. 11, the computer system 1114 may be a standard stand-along computer equipped with motion controllers. If the analytical system 1126 conveys the characteristic signals 1124 of secondary electromagnetic radiation in an analog form, the computer may need to have an analog-to-digital converter for receiving the characteristic signals 1124 and converting them into a digital form preferred for recording and reporting characterization data. Analog-to-digital converters may also be needed in the computer if the inputs 1117 and 1130 from encoders 1121 and 1131 are in analog form. The data recording module 1119 may be a standard computer memory unit or other means of recording information that may include visual maps and images. The data recording system 1119 may directly record the instantaneous angular positions 1117 ($\lambda$) of the probing beam 1104 and the object positions 1130 (X, Y or $\beta$) with respect to the axis 1112 of probing beam spinning. These data are sufficient to calculate the position of probing beam spots in the coordinate system of the object surface associated with the characteristic signals 1124. The calculations may be done after or concurrently with scanning and recording process according to the purpose of a characterization. Alternatively, instead of recording the coordinates of an object and a probing beam, every value of the characteristic signal 1030 may be recorded in association with the time of its collection. The time will be sufficient to calculate the coordinates of characteristic signals 1030 on the object surface provided the speeds and starting points of object movement and probing beam spinning are known.

The miniature architecture of an apparatus for characterization allows accommodating two or more sources of electromagnetic radiation forming a plurality of probing beams. If electromagnetic radiation from several sources is directed to a same spot on the surface of an object, the radiation power at a beam spot may be increased in favor of characterization sensitivity. Illumination of a beam spot from a plurality of directions and/or angles may also favor improving an intensity of a characteristic signal and sensitivity and of a characterization method and apparatus. Several electromagnetic sources providing probing beams with different wavelengths may also be used. This may be beneficial for identifying features sensitive to specific spectra of probing electromagnetic radiation. Several analytical systems may be used for collecting and measuring different characteristic parameters of the secondary electromagnetic radiation making a characterization method more informative.

Compactness or portability of the apparatus for characterization is a significant enablement provided by the present invention. This advantage may be further enhanced by integrating the system that generates electromagnetic radiation and some components of the analytical system into a beam directing system as explained in the embodiment illustrated in FIG. 12. A moving stage 1201 repositions a characterized object 1202 or a beam directing system 1206 in a direction perpendicular to the axis 1203 of probing beam spinning. An encoder of the moving stage 1201 communicates the position of the spin axis 1203 on the surface of the characterized object 1202 in terms of coordinates 1213 to a computer system 1112 for processing and/or recording. The beam directing system 1206 is attached to the shaft 1215 of a servo motor 1209 that spins the system 1206. The spin axis 1203 is perpendicular to the surface of the characterized object 1202. The encoder 1210 of the motor 1209 feedbacks the angular positions 1211 ($\lambda$) of the probing beam 1204 to the computer system 1212 for recording. A source 1205 of electromagnetic radiation, such as a laser diode or X-ray tube, is attached to the beam directing system 1206 in a fixed relation. It provides a probing beam 1204 that illuminates the surface of the characterized object 1202 at a probing beam spot remote from the spin axis 1203. The probing beam 1204 interacts with the characterized object 1202 and generates secondary electromagnetic radiation.

Figure 12:
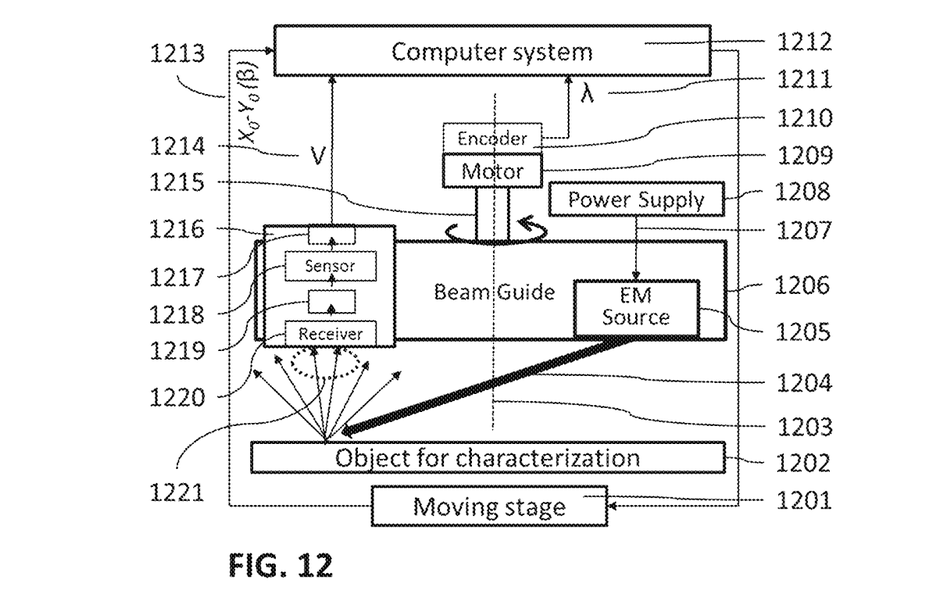
FIG. 12 is a depiction of a block diagram of a compact characterization apparatus with a radiation source and an analytical module integrated with a beam directing system.

Still referring to FIG. 12, the analytical system 1216 receives a portion 1221 of the secondary electromagnetic radiation, detects its expected characteristic signals 1214 (V) and communicates them to the computer system 1212 for processing and/or recording. The analytical system 1216 is attached in a fixed relation to the beam directing system 1206. The analytical system 1216 may have a receiving component 1220, a first conveying component 1219, that delivers the collected portion 1221 of the electromagnetic radiation to a detector or sensor 1218 and a second conveying component 1217 that communicates values of the characteristic signals 1214 to the computer system 1212 for processing and/or recording. Preferably, the receiving component 1220, the first conveying component 1219 and the detector 1220 are integrated in one electronic device. The second conveying component 1217 may be any electronic device that provides wireless communication of the characteristic signal 1214 to the computer system 1212 such as an RF or optical transmitter.

At a chosen frequency, data identifying instantaneous positions of the probing beam spot on the surface of the characterized object 1202 are processed and/or recorded synchronously with the obtained characteristic signal 1214 (V). The instantaneous positions of the probing beam spots specifically relate to angular positions 1211 ($\lambda$) of the probing beam with respect to the spin axis 1203 and the coordinates 1213 ($X_0$, $Y_0$, or $\beta$) of the characterized object repositioning. The computer system 1212 controls all motors and the frequency of recording the characteristic signals. Therefore, it may calculate absolute positions of instantaneous beam spots and conveniently report characterization results in the coordinate system of the surface of the characterized object 1202.

Still referring to FIG. 12, the source 1205 of electromagnetic radiation and the analytical system 1216 need to be supplied with electrical power. This may be implemented with a brush electrical contact between a stationary power supply unit 1208 and the spinning beam directing system 1205. A preferred option is to power spinning components of the apparatus wirelessly with conventional means of wireless power transfer through electromagnetic fields.

Figure 13:
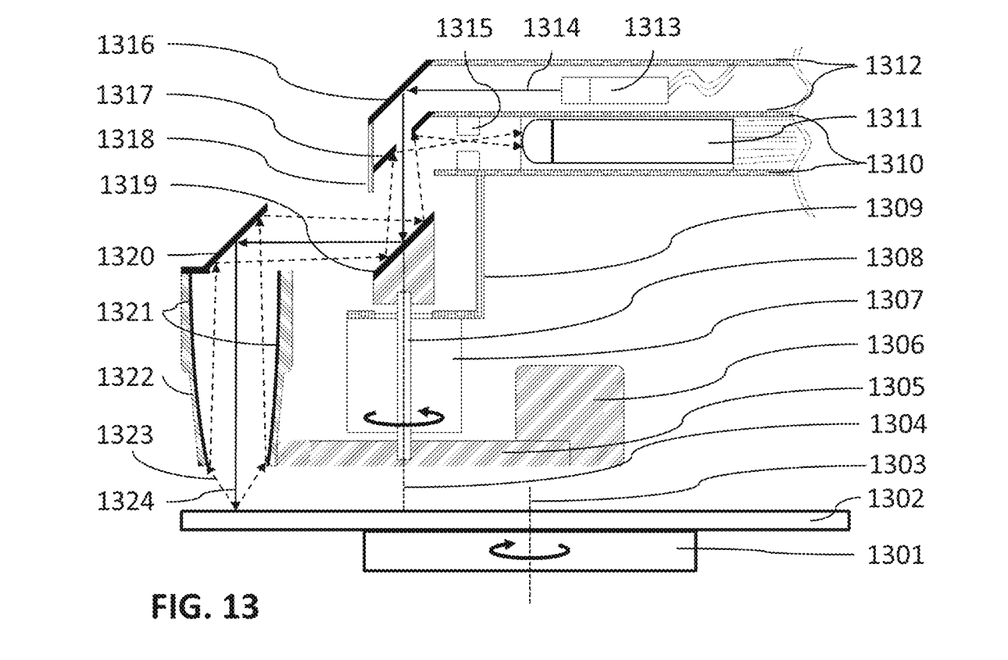
FIG. 13 illustrates an embodiment of a characterization apparatus for detecting particles on the surface of semiconductor wafers.

Another embodiment of the architecture of an apparatus according to the present invention is illustrated in FIG. 13. It is configured for detecting particles on surfaces of semiconductor wafers. A moving table 1301 holds a wafer 1302 and slowly rotates it about the axis 1303 perpendicular to the wafer surface. Stationary components of the apparatus include: a laser 1313 in the laser holder 1312, a photon counter 1311 in the photon counter holder 1310, the aperture 1315, the first mirror 1316, the second mirror 1317 with a hole in its center, the mirror fastener 1318 and the motor 1307 suspended on the frame 1309. Spinning components of the apparatus include: the motor shaft 1308 with the third mirror 1319 and the supporting round plate 1305 attached to it, the hollow cylinder 1322 with an inner surface engineered as the elliptical mirror 1321, the fourth mirror 1320 attached to the hollow cylinder and the mass balancing load 1306. The spinning components are spun by the motor 1307 about the spin axis 1304 that is oriented perpendicular to the surface of the inspected wafer 1302.

Still referring to FIG. 13, the laser 1313 provides a primary laser beam 1314 that is guided through the beam directing system of the apparatus. First, it is reflected by the stationary first mirror 1316 down through the hole in the stationary second mirror 1317. Then it reaches the spinning third mirror 1319 and gets reflected onto the spinning fourth mirror 1320. The fourth mirror 1320 forms a spinning probing beam 1324 by directing the laser beam onto the wafer surface through the hollow cylinder 1322. The probing beam 1324 is reflected and scattered on the surface, the intensity of scattering correlates to the type and size of surface defects. The portion of the probing beam reflected from the wafer surface goes back through the same path in the beam directing system but in a reverse direction and gets finally damped within the laser holder. The portion 1323 of the probing beam 1324 is scattered in a plurality of directions from the beam spot of the laser beam on the wafer surface. It is collected by the ellipsoidal mirror 1321 that is designed to focus it at the aperture 1315 in front of the photon counter 1311. The aperture 1315 is optional and its role is to cut off a noise associated with background light and parasitic reflections in the system so that the apparatus sensitivity and resolution for detecting small particles is improved. As described in the previous embodiments, a computer system of the apparatus registers the coordinates of the laser beam spots on the wafer surface and associates those coordinates with the signals from the photon counter 1311. Preferably, the photon counter signals are correlated to sizes and other characteristics of surface particles and other defects. Then, the computer system of this characterization apparatus may report the results of the overall characterization as maps of defect distributions on wafer surfaces.

The apparatus disclosed in the present invention is a complex system comprising many components that interact mechanically, optically and electrically in an intricate and coordinated manner. However, every component of the apparatus, as described above, has various readily available appropriate solutions and products on the market. For those skilled in electronics, automation or robotics, this would be a standard task to select and integrate controlling, communicating and recording components according to the functions described in the present invention. For those skilled in the field of mechanical engineering, this is trivial to select or manufacture mechanical and optical components, assemble them into an apparatus according to the present invention and achieve the intended benefits. Numerous specific implementations of the disclosed apparatus may exist. Examples given the present description provide particular solutions and do not intend to limit the scope of the invention.

The invention claimed is:

1. A method for characterizing objects, the method comprising:
    providing an object for characterization;
    forming a probing beam of electromagnetic radiation directed onto a surface of the object, the probing beam interacts with the object resulting in a secondary electromagnetic radiation;
    measuring characteristic parameters of the secondary electromagnetic radiation;
    spinning the probing beam of electromagnetic radiation about a spin axis perpendicular to the surface of the object, the probing beam illuminates the surface of the object with a beam spot that spins along a circular orbit;
    setting the object and the spin axis in a relative motion directed perpendicular to the spin axis;
    and recording the measured values of the characteristic parameters of the secondary electromagnetic radiation synchronously with instantaneous coordinates of the beam spot on the surface of the object.

2. The method for characterizing objects of claim 1, wherein
    the characteristic parameters are measured at a frequency $$F \geq 0.05 \cdot D \cdot S/W \text{ and}$$

where
    F is obtained in Hz (Hertz);
    W is the width of the probing beam at the surface of the object in mm;
    S is the rate of probing beam spinning in rpm (revolutions per minute);
    and D is the diameter of the circular orbit of the beam spot spinning on the surface of the object in mm.

3. The method for characterizing objects of claim 1, wherein
    the relative motion between the object and the spin axis is implemented along a linear direction or a sequence of linear directions.

4. The method for characterizing objects of claim 3, wherein
the relative motion between the object for characterization and the spin axis is implemented at a speed $$V \leq S \cdot W / \cos(A),$$

where
V is obtained in mm/min;
S is the rate of probing beam spinning in rpm (revolutions per minute);
W is the width of the probing beam at the surface of the object in mm;
and A is the angle of incidence of the probing beam on the surface of the object or the angle between the probing beam and the axis of its spinning.

5. The method for characterizing objects of claim 3, wherein
the relative motion between the object and the spin axis is implemented by steps of a length $$Q \leq W / \cos(A),$$

where
Q is the length of the steps obtained in mm;
W is the width of the probing beam at the surface of the object in mm;
and A is the angle of incidence of the probing beam on the surface of the object or the angle between the probing beam and the axis of its spinning.

6. The method for characterizing objects of claim 1, wherein
the object for characterization and the spin axis are set in the relative motion of a rotation about a rotation axis;
the rotation axis is configured perpendicular to the surface of the characterized object;
and the rotation axis is positioned at a distance R>0 from the spin axis.

7. The method for characterizing objects of claim 6, wherein
the rotation of the characterized object with respect to the spin axis is implemented at a rate $$P \leq 0.16 \cdot S \cdot W / (R \cdot \cos(A)),$$

where
P is obtained in rpm (revolutions per minute);
S is the rate of probing beam spinning in rpm (revolutions per minute);
W is the width of the probing beam at the surface of the object in mm;
R is the distance between the rotation axis and the spin axis in mm;
and A is the angle of incidence of the probing beam on the surface of the object or the angle between the probing beam and the axis of its spinning.

8. An apparatus for characterizing objects, the apparatus comprising:
a source of electromagnetic radiation that forms a primary beam of electromagnetic radiation;
a shaft that spins about a spin axis perpendicular to a surface of an object for characterization;
a beam guiding system attached to the shaft, the beam guiding system directs the primary beam of electromagnetic radiation onto the surface of the object at a beam spot apart from the spin axis;
an actuator that repositions the object for characterization or/and the shaft in a direction perpendicular to the spin axis;
an analytical system that collects and measures characteristic parameters of at least a portion of a secondary electromagnetic radiation instigated by the primary beam of electromagnetic radiation from the object for characterization at the beam spots on the surface of the object for characterization;
and a register system that records the measured characteristic parameters of the secondary electromagnetic radiation synchronously with instantaneous coordinates of the beam spots at which the secondary electromagnetic radiation is instigated, collected and measured.

9. The apparatus of claim 8, further comprising:
a first encoder that provides instantaneous angular positions of the primary beam of electromagnetic radiation with respect to the spin axis;
a second encoder that provides instantaneous coordinates of the object for characterization with respect to the spin axis;
and a computer system that calculates the instantaneous coordinates of the beam spots based on provided data about the angular positions of the primary beam of electromagnetic radiation and the coordinates of the object for characterization with respect to the spin axis.

10. The apparatus of claim 8, wherein:
the source of electromagnetic radiation is attached to the beam guiding system;
and the source of electromagnetic radiation is empowered wirelessly from a power supply module external to the beam guiding system.

11. The apparatus of claim 10, further comprising:
a wireless electromagnetic power transmitter to empower the source of electromagnetic radiation from the power supply module.

12. The apparatus of claim 8, wherein:
the analytical system is attached to the beam guiding system and empowered wirelessly from a power supply module external to the beam guiding system;
and the analytical system communicates the measured characteristic parameters to the register system through wireless data transmission.

13. The apparatus of claim 12, further comprising:
a wireless electromagnetic power transmitter to empower the analytical system;
and an RF or optical transmitter to wirelessly communicate the measured characteristic parameters from the analytical system to the register system.

14. The apparatus of claim 8, wherein:
the shaft is hollow;
the source of electromagnetic radiation is external relative to the beam guiding system;
and the primary beam of electromagnetic radiation is transmitted towards the surface of the object for characterization through the bore in the hollow shaft.

15. The apparatus of claim 8, wherein:
the actuator that repositions the object for characterization or/and the shaft perpendicular to the spin axis is a rotational actuator or a linear actuator.

16. The apparatus of claim 8, further comprising:
a plurality of sources of electromagnetic radiation forming a plurality of primary beams of electromagnetic radiation directed at a same spot on the surface of the object for characterization.

17. The apparatus of claim 8, further comprising:
a plurality of analytical systems for collecting and measuring characteristic parameters of the secondary electromagnetic radiation.

18. The apparatus of claim 8, wherein:
the beam guiding system directs the primary beam of electromagnetic radiation onto the surface of the object at an angle of incidence from 0 to 60°.

19. The apparatus of claim 8, wherein:
the source of electromagnetic radiation forms a primary beam of electromagnetic radiation with wavelengths in the range from 10 nm to 1000 nm.

20. The apparatus of claim 8, wherein:
the source of electromagnetic radiation forms a primary beam of electromagnetic radiation with wavelengths in the range from 0.01 nm to 10 nm.

* * * * *